Figure 1:
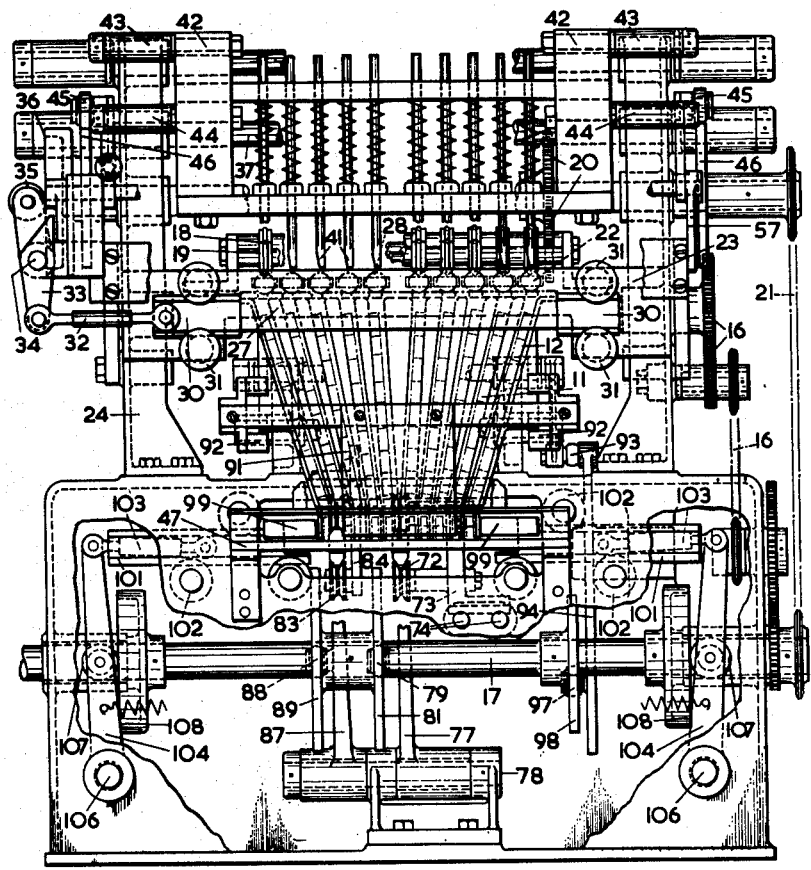

Oct. 8, 1963　　　A. R. BAILEY　　　3,106,315
PACKAGING APPARATUS

Filed Dec. 13, 1962　　　5 Sheets-Sheet 1

Inventor

By

Attorney

Oct. 8, 1963    A. R. BAILEY    3,106,315
PACKAGING APPARATUS

Filed Dec. 13, 1962    5 Sheets-Sheet 5

Inventor

By

Attorney

United States Patent Office 3,106,315
Patented Oct. 8, 1963

3,106,315
PACKAGING APPARATUS
Arthur Raymond Bailey, Gainsborough, England, assignor to Rose Brothers (Gainsborough) Limited, Gainsborough, England, a British company
Filed Dec. 13, 1962, Ser. No. 244,334
Claims priority, application Great Britain Dec. 14, 1961
3 Claims. (Cl. 221—93)

This invention relates to packaging apparatus, and is concerned with the feeding and collecting of successive given numbers of articles, e.g., sweets, in the form of regular batches with the articles lying end to end for subsequent feeding as a succession of batches to a wrapping or packaging machine. The articles may have been previously wrapped individually before the batching operation.

According to the present invention, a packaging apparatus for the above purpose comprises an open-topped hopper formed with a series of downwardly extending chutes each adapted to receive articles in succession for the articles to gravitate to the bottom of the hopper, a transfer support adapted to receive the lowermost articles in the hopper to form successive batches, a pusher adapted to move transversely into engagement with the batch of articles on the transfer support, said pusher being constituted by inner and outer relatively movable members, the inner and outer members being adapted to move in unison to push the batch along the support to clear the hopper, a pair of positioning members adapted after such pushing action to move endwise of the batch to move the individual articles into close juxtaposition on the transfer support, the inner member of the pusher then being adapted further to move to push the juxtaposed batch into a waiting pocket of an intermittently movable conveyor arranged to transport the successive batches to a wrapping machine.

The chute walls preferably extend substantially to the bottom of the hopper, and in such a case, the pusher is bifurcated to provide a number of tines corresponding to the number of chutes, the tines passing between the chute walls into engagement with the individual articles.

The inner and outer members of the pusher are conveniently individually mounted for sliding movement between sets of three rollers, and are reciprocated by cam, lever and link mechanism, the cams being profiled to provide the initial movement of the two members in unison and the further movement of the inner member.

In this manner, the successive batches are first formed at the base of the hopper, then moved transversely clear of the hopper on the transfer support as batches of spaced articles, then closed up endwise to form the closely juxtaposed batches and finally transferred by the inner pusher (which substantially corresponds in overall length with the length of the juxtaposed batch) into the successive pockets of the wrapping machine conveyor.

Figure 2:
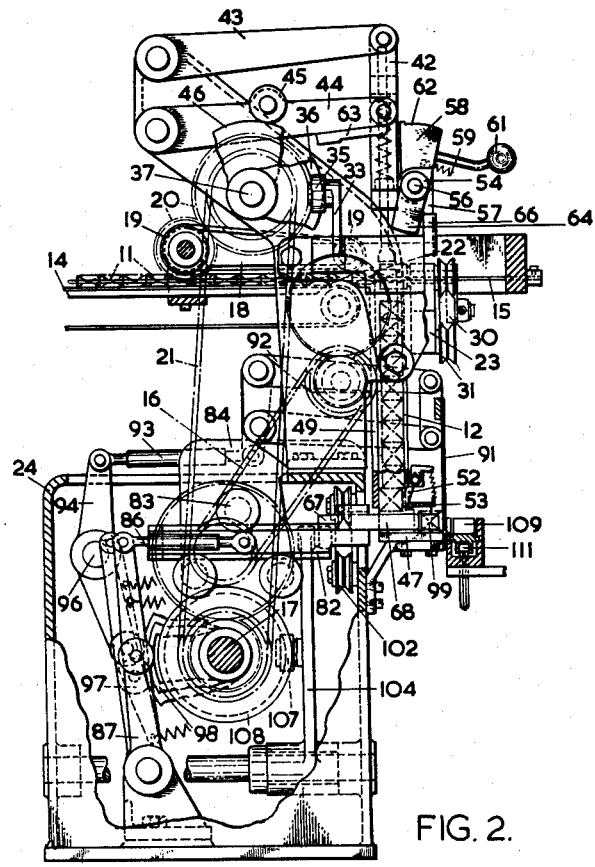
Figure 3:
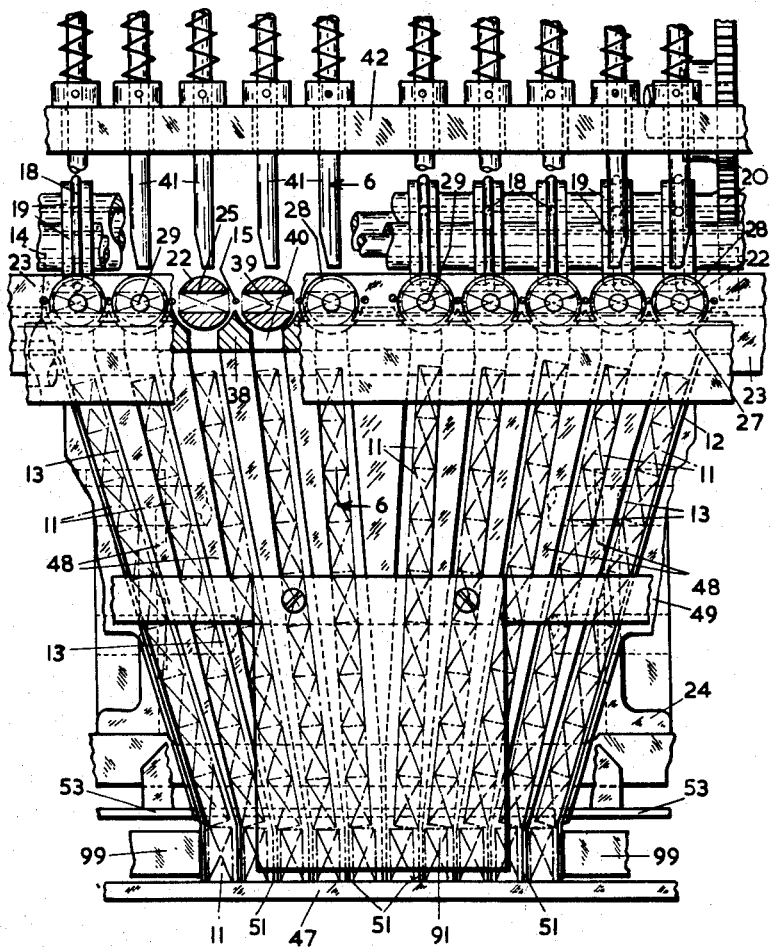
Figure 4:
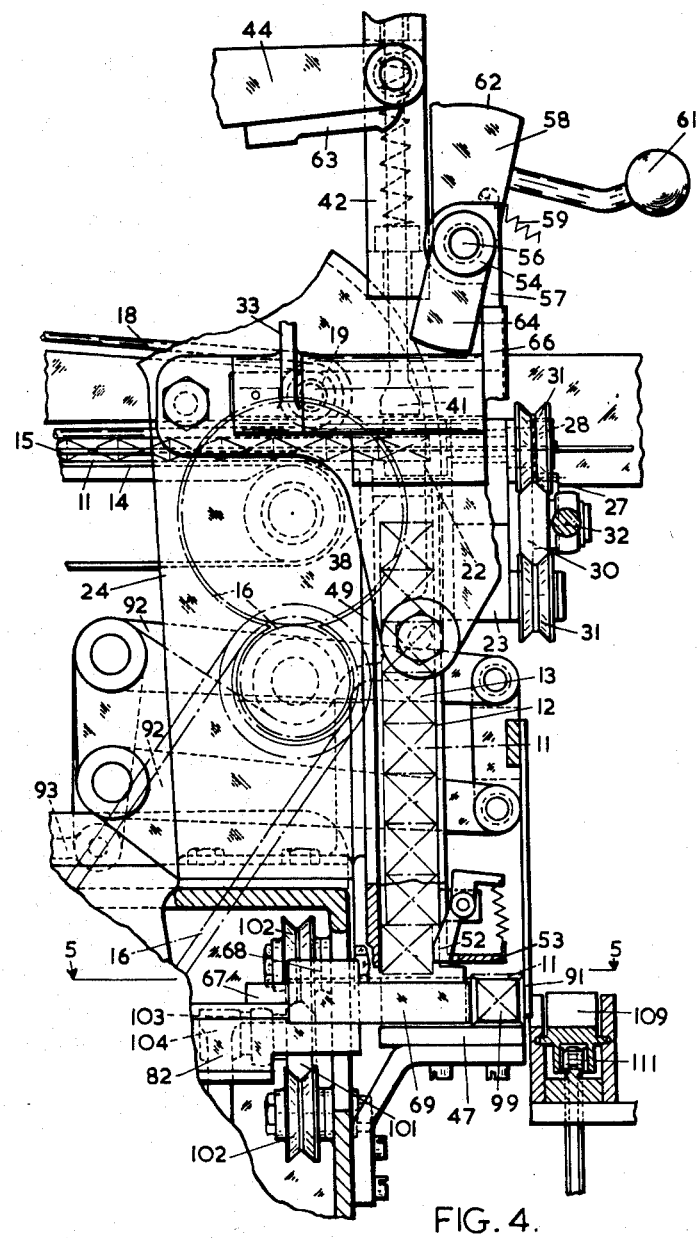
Figure 5:
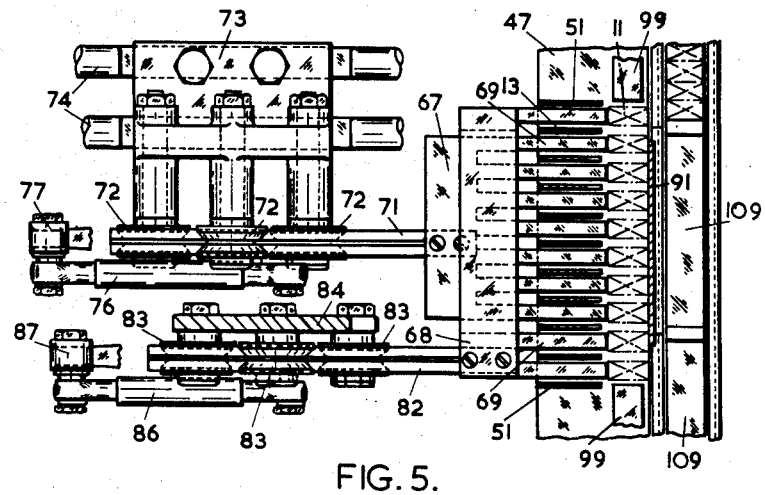
Figure 6:
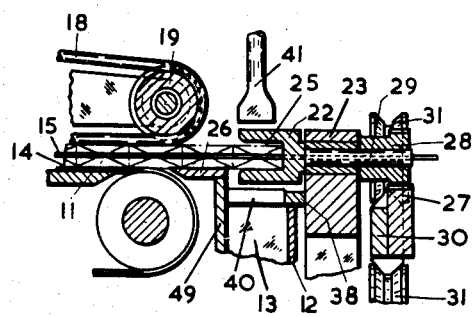

By way of example, the invention will now be described in greater detail with reference to the accompanying drawings, in which:

FIGURE 1 is an elevation of an apparatus for the feeding and collecting of wrapped toffees into regular batches for transfer to a wrapping machine, FIGURE 2 is a side view, partly in section, of the apparatus shown in FIGURE 1, FIGURE 3 is a fragmentary view, drawn to a larger scale, of part of the apparatus shown in FIGURE 1, FIGURE 4 is a side view, partly in section of the apparatus shown in FIGURE 3, FIGURE 5 is a sectional plan view taken on the line 5—5 in FIGURE 4, FIGURE 6 is a section taken on the line 6—6 in FIGURE 3, and FIGURES 7, 8, 9 and 10 are diagrams, illustrating the operation of a part of the apparatus.

Sweets 11 are fed towards a collecting station, situated at the top of a multiple hopper 12 formed with a series of downwardly extending chutes 13, in separate lanes by a common conveyor belt 14, the lanes being separated by fixed wires 15. The sweets are supplied to the belt 14 by an automatic feeding device (not shown) and the belt 14 is driven through chain and sprocket gearing 16 from a main drive shaft 17. The frictional urge of the belt 14 on the sweets 11 is augmented by a series of bands 18, one for each lane, the bands 18 being mounted on pulleys 19 and driven through spur gears 20 and chain and sprocket gearing 21 from the shaft 17. At the collecting station a plurality of transfer members 22 (one for each lane) are rotatably mounted in a plate 23 secured to the framework 24 of the apparatus. Each transfer member 22 is formed with an open-ended slot 25 adapted freely to receive the successive leading sweet 11 from a given lane, the base of the slot 25 lying substantially in the same plane as the upper surface of the belt 14. A common dead plate 26 is positioned between the belt 14 and transfer members 22 to guide the sweets 11 into the slots 25, the sweets 11 being pushed home into their respective slots by succeeding sweets (see FIGURE 6). As the leading sweets 11 from the respective lanes are received in the slots 25 of the respective transfer members 22, the latter are rotated through 90° to cause the slots 25 to extend downwardly, such movement being effected by a toothed rack member 27 the teeth of which are arranged in mesh with pinions 28 secured to the pivot shafts 29 of the transfer members 22, the rack member 27 being secured to a slide bar 30 guided in grooved rollers 31 freely rotatable on the plate 23. The slide bar 30 is connected by a link 32 to an arm 33 pivotally mounted at 34 and carrying a roller 35 arranged to engage a rotatable cam 36 secured to a shaft 37 driven by the gearing 21 from the shaft 17. A bar 38, secured to the plate 23, is formed with a series of semi-circular grooves 39 each surrounding the lower half of a transfer member 22 to retain the sweets 11 in the slots 25 of the transfer members 22 during rotational movement thereof, suitable apertures 40 being provided in the bases of the grooves to allow the sweets to fall into the hopper 12 after such rotational movement.

Arranged above the transfer members 22 are a series ejectors 41, one for each transfer member 22, resiliently mounted on a support bracket 42 carried on a pair of parallel motion linkages comprising arms 43 and 44, the linkages being pivotally mounted on each side of the apparatus on the framework 24. The arm 44 of each linkage carries a roller 45 arranged to engage a rotatable cam 46 secured to the shaft 37. Upon completion of the pivotal action of the transfer members 22 to turn the sweets through 90° the ejectors are operated to pass through the slots 25 (while the slots 25 extend downwardly) to eject any sweets that have not fallen by gravity and allow them to gravitate down the respective chutes 13 of the hopper 12 towards a delivery support 47. The chutes 13 in the hopper 12 are separated by partitions 48 extending from the rear face 49 of the hopper 12 and for reasons dictated by mechanical considerations arising from the construction and operation of the transfer members 22 which, as mentioned above, are arranged one over each chute 13, the lateral pitching of the chutes 13 is greater at the upper end of the hopper than is necessary or desirable at the lower end of the hopper 12. The chutes 13 are therefore arranged to converge somewhat downwardly towards the lower end of the hopper 12, the partitions 48 being so tapered that the chutes are separated at the lower ends only by thin wall portions 51.

As the leading sweet 11 of each file is received in the slot 25 of the respective transfer member 22 (the slot being arranged horizontally in the receiving position), the rack and pinion mechanisms 27 and 28 operates to rotate the transfer members 22 simultaneously through 90° to cause the slots 25 to extend downwardly. The depth of the slots 25 is somewhat less than the length of the sweets 11 to ensure that only the leading sweets 11 are engaged by the slots 25. The ejectors 41 are then operated to pass through the slots to eject any articles that have not fallen from the slots by gravity. The sweets 11 thus released from the transfer members 22 then gravitate down the respective chutes 13 on to the delivery support 47 in the form of a batch, the sweets 11 standing on edge and lying end to end separated only by the walls of the chutes 13.

Under normal running conditions, the various chutes 13 of the hopper 12 will be full of sweets 11 standing on top of each other, and it is convenient to provide this condition when the apparatus is first started up. To this end, there is provided near the bottom of the hopper 12, at a height above the delivery support 47 a little over the height of the sweets 11, a series of individually spring urged trapper members 52 arranged to pass between the wall portions 51 of the respective chutes 13 so as to engage the leading sweets 11 gravitating down the chutes 13, and trap them against the rear face 49 of the hopper, thus temporarily arresting the sweets 11. The trapper members 52 are pivotally mounted on a plate 53 secured to the framework 24.

The sweets 11 thus build up in the chutes 13 until the topmost sweet 11 in each chute 13 is in a position to be forced downwardly by the succeeding sweets 11 being ejected from the transfer member 22 by the ejector 41. In these circumstances, each time a row of sweets 11 is moved into the chutes 13 of the hopper 12 from the transfer members 22, the lowermost row of sweets 11 in the hopper are pushed downwardly, clear of the trappers 52, onto the support 47 in the form of a batch, the sweets 11 standing on edge and lying end to end separated only by the wall portions 51 of the chute 13 (see FIGURE 7).

The sweets 11 may be fed onto the conveyor belt 14 by automatic feeding means, e.g., as described in British specification No. 43621/59, the conveyor belt 14 running at a somewhat greater speed than is strictly necessary to provide the number of batches required by the wrapping machine, so that the sweets 11 will accumulate in the lanes in close files. In order to provide such an accumulation when the machine is first started up, sprag devices 54 are arranged, one on each side of the apparatus, to arrest the actions of the mechanisms controlling the transfer members 22 and ejectors 41. The sprag devices 54 are secured to a shaft 56 pivotally mounted in brackets 57 secured to the framework 24. Each device 54 is provided with a lug 58, and a spring 59 is secured between the devices 54 and framework 24 to hold the devices in inoperative position. The devices 54 are moved into operative position by an operator rotating the devices 54, by the aid of a handle 61 secured to one of the lugs 58, in an anticlockwise direction so that the upper portion 62 of each lug 58 engages a latch member 63 secured to the underside of each arm 44, such action holding the rollers 45 off the cams 46 and thus arresting the downward movement of the ejectors 41. The action of rotating the devices 54 also causes a further lug 64 extending from one of the devices 54 to move into the path of an extension 66 of the arm 33 thus holding the roller 35 off the cam 36 to arrest the movement of the rack member 27. As soon as each lane is full of sweets 11, the operator releases the devices 54 whereupon the sweets 11 are transferred in succession into the respective chutes 13 of the hopper 12 and, when the chutes are filled, successive batches are transferred from the bottom of the hopper 12 onto the support 47 as mentioned above.

Figures 7, 8:
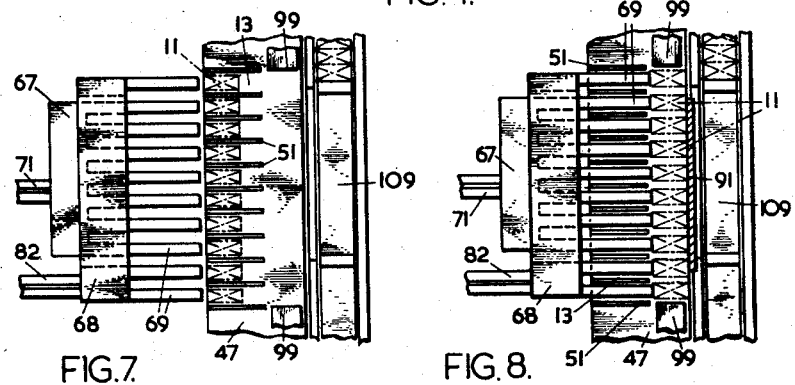

The successive batches are moved transversely, clear of the hopper, on the support 47 by a bifurcated pusher constituted by inner and outer relatively movable members 67 and 68, respectively, provided with a number of tines 69 corresponding to the number of chutes 13 of the hopper 12 (see FIGURE 7). The inner member 67 is mounted on a bar 71 for sliding movement between a set of V grooved rollers 72 rotatably mounted on a bracket 73 secured to rods 74 mounted on the framework 24. A link 76 connects the bar 71 to an arm 77 pivotally mounted on a shaft 78, the arm 77 carrying a roller 79 arranged to bear against the face of a rotatable cam 81 secured to the shaft 17. The outer member 68 is similarly mounted on a bar 82 for sliding movement between a set of V grooved rollers 83 rotatably mounted on an extension 84 of the framework 24. A link 86 connects the bar 82 to an arm 87 pivotally mounted on the shaft 78, the arm 87 carrying a roller 88 arranged to bear against the face of a rotatable cam 89 secured to the shaft 17. The cams 81 and 89 are so profiled as to provide an initial movement of the two members 67 and 68 in unison, to push the batch of sweets 11 along the support 47 to an intermediate positon clear of the hopper 12 (see FIGURE 8) at which is arranged a stop 91 mounted on a parallel motion linkage 92 for movement into and out of the path of movement of the batch. A link 93 connects the linkage 92 to an arm 94 pivotally mounted at 96 and carrying a roller 97 arranged to bear against the face of a rotatable cam 98 secured to the shaft 17.

Figure 9:
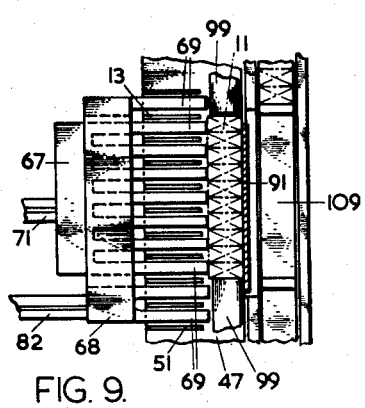
Figure 10:
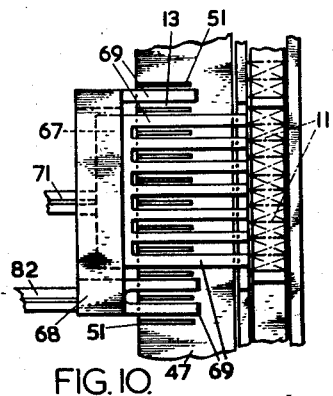

At the intermediate position a pair of reciprocating positioning members 99, mounted one on either side of the pusher, are arranged to move towards each other endwise of the batch to move the individual sweets 11 into close juxtaposition (see FIGURE 9). The members 99 are each mounted on a bar 101 for sliding movement between a set of V grooved rollers 102 mounted on the framework 24. Links 103 connect the bars 101 to arms 104, pivotally mounted at 106, each arm 104 carrying a roller 107 arranged to bear against the face of a rotatable cam 108 secured to the shaft 17.

After such endwise movement of the members 99, they are retracted clear of the path of movement of the inner member 67 of the pusher, and the movable stop is lifted clear of the batch, the inner member 67 then continuing its movement to transfer the batch from the support 47 into a waiting pocket 109 on an intermittently movable conveyor chain 111 (see FIGURE 10) arranged to transport the successive batches of sweets 11 to a wrapping machine.

I claim:

1. Packaging apparatus for the purpose specified, comprising an open-topped hopper formed with a series of downwardly extending chutes each adapted to receive articles in succession for the articles to gravitate to the bottom of the hopper, a transfer support adapted to receive the lowermost articles in the hopper to form successive batches, a pusher adapted to move transversely into engagement with the batch of articles on the transfer support, said pusher being constituted by inner and outer relatively movable members, the inner and outer members being adapted to move in unison to push the batch along the support to clear the hopper, a pair of positioning members adapted after such pushing action to move endwise of the batch to move the individual articles into close juxtaposition on the transfer support, the inner member of the pusher then being adapted further to move to push the juxtaposed batch into a waiting pocket of an intermittently movable conveyor arranged to transport the successive batches to a wrapping machine.

2. Packaging apparatus for the purpose specified, comprising an open-topped hopper formed with a series of downwardly extending chutes each adapted to receive articles in succession for the articles to gravitate to the bottom of the hopper, a transfer support adapted to receive the lowermost articles in the hopper to form successive batches, a bifurcated pusher formed with a number of tines corresponding to the number of chutes, said pusher being adapted to move transversely into engagement with the batch of articles on the transfer support, the tines passing between the chute walls into engagement with the individual articles, said pusher being constituted by inner and outer relatively movable members, the inner and outer members being adapted to move in unison to push the batch along the support to clear the hopper, a pair of positioning members adapted after such pushing action to move endwise of the batch to move the individual articles into close juxtaposition on the transfer support, the inner member of the pusher then being adapted further to move to push the juxtaposed batch into a waiting pocket of an intermittently movable conveyor arranged to transport the successive batches to a wrapping machine.

3. Packaging apparatus for the purpose specified, comprising an open-topped hopper formed with a series of downwardly extending chutes each adapted to receive articles in succession for the articles to gravitate to the bottom of the hopper, a transfer support adapted to receive the lowermost articles in the hopper to form successive batches, a pusher adapted to move transversely into engagement with the batch of articles on the transfer support, said pusher being constituted by inner and outer members individually mounted for sliding movement, means for reciprocating the inner and outer members in unison to push the batch along the support to clear the hopper, a pair of positioning members adapted after such pushing action to move endwise of the batch to move the individual articles into close juxtaposition on the transfer support, the reciprocating means then being arranged further to move the inner member of the pusher to push the juxtaposed batch into a waiting pocket of an intermittently movable conveyor arranged to transport the successive batches to a wrapping machine.

References Cited in the file of this patent
UNITED STATES PATENTS

| | | |
|---|---|---|
| 2,822,953 | Kunath | Feb. 11, 1958 |
| 3,032,211 | Wordsworth | May 1, 1962 |